June 21, 1949. E. H. GILLITZER 2,473,519
POISE MOUNTING FOR RACING CARS
Filed Sept. 26, 1947 3 Sheets-Sheet 2

INVENTOR.
EDWARD H. GILLITZER,
BY
McMorrow, Berman & Davidson
ATTORNEYS.

June 21, 1949. E. H. GILLITZER 2,473,519
POISE MOUNTING FOR RACING CARS
Filed Sept. 26, 1947 3 Sheets-Sheet 3
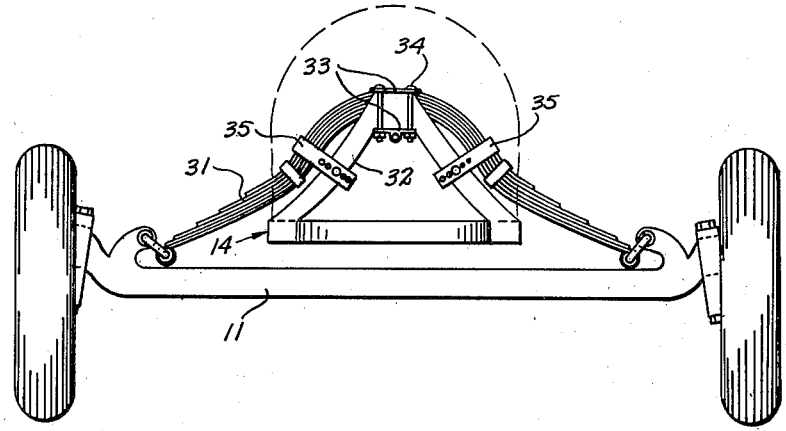
FIG. 3.
FIG. 4.
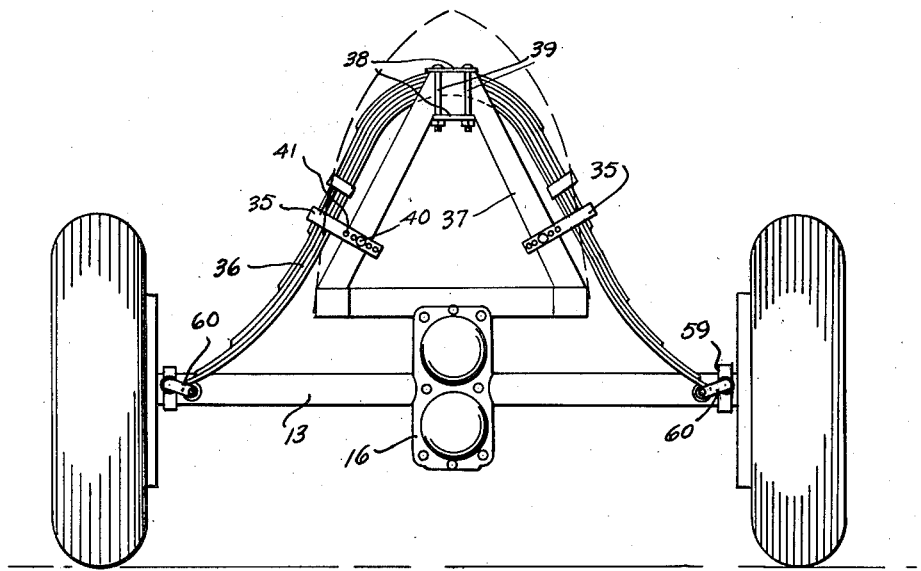
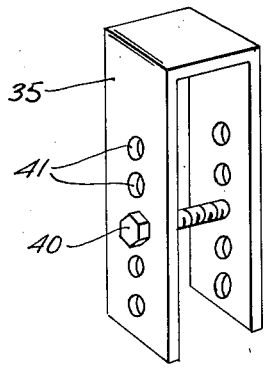
FIG. 5.
Inventor
EDWARD H. GILLITZER,
By McMorrow, Berman & Davidson
Attorneys Patented June 21, 1949

2,473,519

UNITED STATES PATENT OFFICE 2,473,519

POISE MOUNTING FOR RACING CARS

Edward H. Gillitzer, San Diego, Calif.

Application September 26, 1947, Serial No. 776,248

6 Claims. (Cl. 280—112)

This invention relates to improvements in spring suspension systems for automotive vehicles, and more particularly to a poise mounting for racing cars.

While all types of automotive vehicles are likely to experience more or less difficulty in rounding sharp curves at high speed, the condition is particularly pronounced in the case of racing cars running on a closed track so that two curves must be negotiated each time the car encompasses the track. Most accidents that occur in automobile racing occur on or near the curves at the ends of the track, and are frequently occasioned by unbalance or skidding of the cars while rounding or leaving the curves. In the past such accidents have resulted in numerous cases of driver injury and fatalities and spectators of such races have frequently been endangered. It is conceived that a large number of such accidents are caused by uncompensated forces set up in the conventional spring suspension systems of racing cars, which forces cause the cars to tilt, lifting the wheels at the inner-side of the curve. Such tilting involves a loss of tire traction frequently resulting in an uncontrollable side-slip or skid or in an upset. Conventional suspension systems also induce large lateral forces at the rear ends of racing cars when rounding curves by reason of the failure of the rear wheels to properly track with the front wheels when steering, and because such conventional suspension systems fail to provide any compensation for the centrifugal force acting on the car.

It is among the objects of the present invention to provide an improved spring-suspension system for an automotive vehicle, and particularly for a racing car, which suspension system is effective to maintain a substantially even distribution of the car weight on all four wheels of the car even when the car is rounding a sharp curve at high speed, and to distribute the centrifugal forces acting upon the car under such conditions among the four wheels so that such centrifugal forces will be absorbed by the road traction of all four wheels, thus greatly reducing any tendency of the car to skid on turns, is further effective to steer the rear wheels in proper tracking relationship with the front wheels to compensate a large part of the centrifugal force normally acting on the rear end of the car to reduce or eliminate the tendency of the rear end to swing out of the steering path, and to also facilitate steering the car around a sharp curve, and which suspension system is of simplified construction utilizing a minimum number of parts, is strong and durable with an adequate factor of safety for the loads imposed thereon, and is economical to construct and easy to service.

Other objects and advantages will become apparent from a consideration of the following description in conjunction with the accompanying drawings, wherein:

Figure 3 is a front elevation of the vehicle illustrated in Figure 1;

Figure 4 is a rear elevation of the vehicle illustrated in Figure 1;

Figure 5 is a perspective view of a clevis, shown in Figures 3 and 4 as providing lost motion connections between the vehicle frame and the vehicle springs to limit tilting movements of the frame relative to the springs;

Figure 6 is a bottom plan detailed view of a fragmentary portion of the vehicle taken substantially on the line 6—6 of Figure 2; and Figure 7 is a transverse cross-section of a fragmentary portion of the vehicle taken substantially on the line 7—7 of Figure 2.

Figure 1:
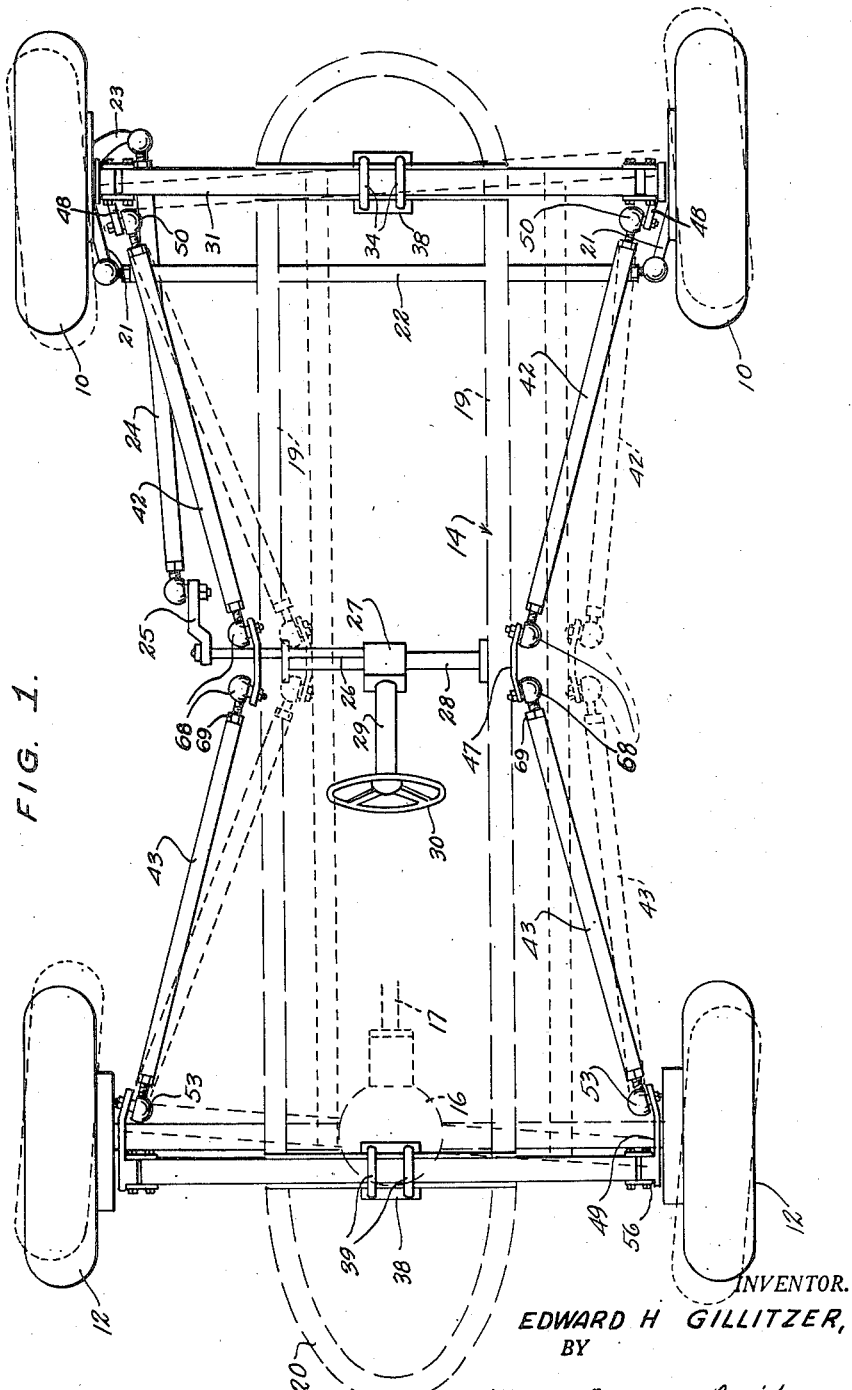
Figure 1 is a top plan view of an automotive vehicle showing a spring-suspension system illustrative of the invention.
Figure 2:
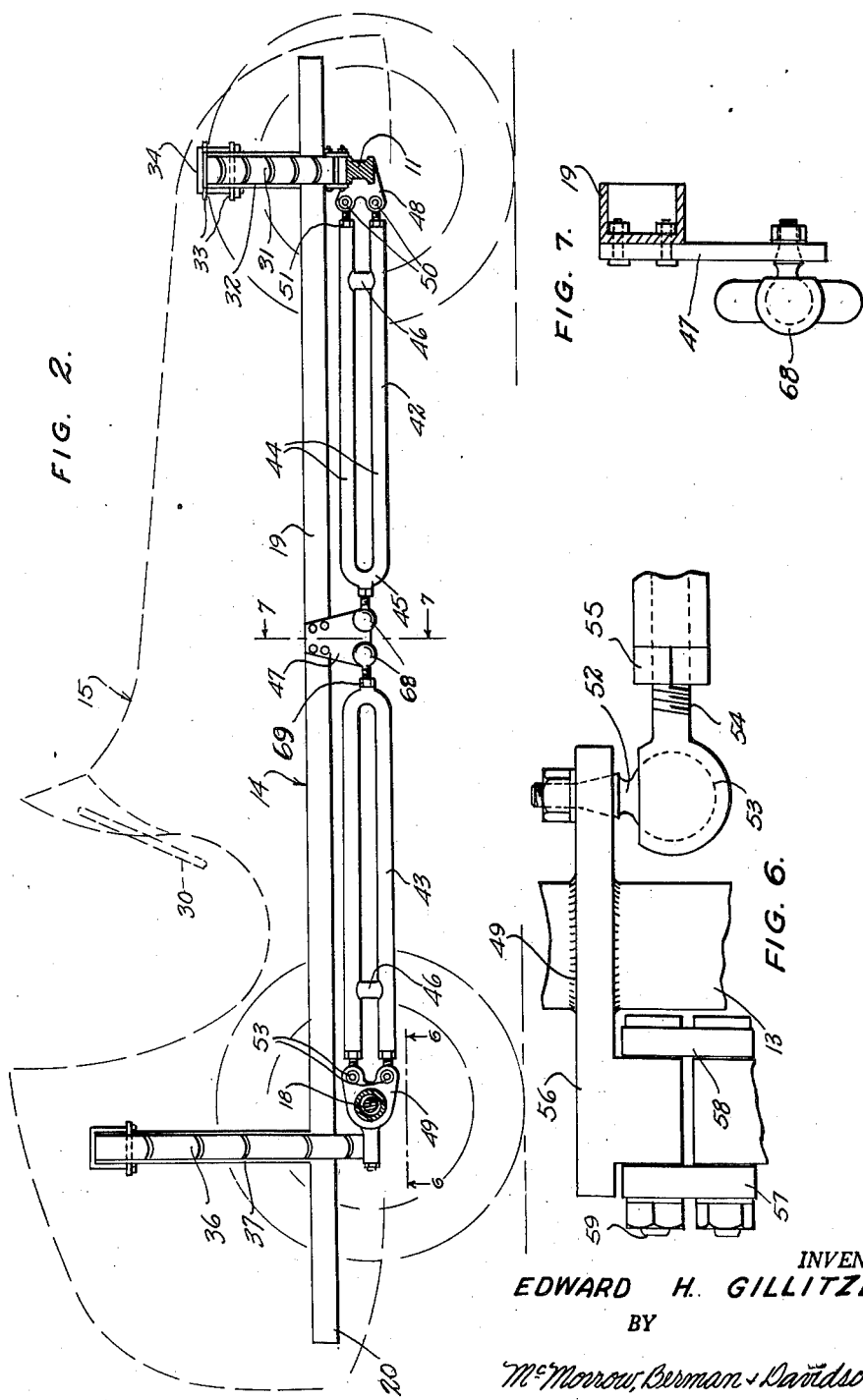
Figure 2 is a side elevation of the vehicle illustrated in Figure 1, certain portions being broken away and shown in section to better illustrate the construction thereof.

With continued reference to the drawings, the vehicle has a pair of front wheels 10 journaled one upon each end of a front axle 11, a pair of rear wheels 12 journaled one at each end of a rear axle housing 13, a frame, generally indicated at 14, supported upon the front and rear axles and a body, generally indicated at 15, carried by the frame.

The front axle may comprise the conventional, rigid member of I cross-section having the usual forks at the opposite ends thereof receiving king pins which pivotally secure the front wheel spindles to the ends of the axle, while the rear axle may include the conventional axle housing 13 having therein a differential structure 16 driven by a drive shaft 17 from an engine, not illustrated, and driving a pair of axle shafts 18 the outer ends of which are operatively connected with the vehicle rear wheels 12.

The frame 14 may comprise a pair of substantially parallel side-frame members 19 of the usual channel shape cross-section and may be joined at the rear ends by a U-shaped bend or continuation 20, which is shaped to conform to the rear end of the body 15.

The front wheel spindles are provided with respective rearwardly-projecting arms 21 the ends of which are pivotally connected by suitable universal or ball-and-socket joints, with the corresponding ends of a steering tie bar 22 and one of the spindles is provided with a forwardly-projecting arm 23 the end of which is connected by a conventional universal joint with the forward end of a drag link 24 the rearward end of which is connected through a universal joint with the outer end of a steering arm 25 the inner-end of which is secured to the outer-end of a steering torque shaft 26 the inner-end of which enters a gear case 27 which is mounted upon a transverse frame member 28 and receives the lower end of the steering column 29 the upper end of which carries the steering wheel 30. Upon rotation of the steering wheel 30 the front wheels 10 will be steered in the conventional manner.

A transverse front spring 31 is secured at its ends to the front axle 11 near the opposite ends thereof and supports the front end of the frame 14. As is clearly shown in Figure 3, this front spring 31 is a flat, multiple-leaf spring having an upstanding, inverted U-shaped intermediate portion the center of which is positioned well above the front axle 11. The frame has a transverse front-end member 32 of inverted U or triangular shape, the apex of which is secured to the center portion of spring 31 by suitable clamp plates 33 and bolts 34. The frame front-end member 32 depends from the center portion of the front spring within the U-shaped intermediate portion of the spring and the front end of the frame 14 is supported thereby upon the front axle 11. A pair of U-shaped clevises 35 surround the spring 31 at locations spaced from the center of the spring and are adjustably secured to the corresponding sides of the frame front-end member 32 to provide lost-motion connections between the frame and the spring so that the frame may tilt relative to the spring and the front axle 11, but the tilting movement of the frame relative to the spring will be limited when the corresponding clevis 35 at one side or the other of the center of the spring comes into contact with the spring. The clevises 35 upon coming into contact with the spring impose a downwardly directed force on the corresponding end of the spring tending to force the front wheel at that side of the vehicle down into firm contact with the roadway or track. As will later become apparent, the clevis at that side of the vehicle disposed at the inner-side of a curve is the one which contacts the spring upon tilting of the frame relative to the spring.

The vehicle also has a rear spring 36 connected at its ends to the rear axle housing 13 near the opposite ends thereof, and of a construction similar to that of the front spring 31 except that its U-shaped intermediate portion extends a greater distance above the rear axle 13 than the U-shaped intermediate portion of the front spring extends above the front axle 11. The frame has a rear end member 37 which is also of inverted U shape or generally triangular form and is secured at its apex to the center portion of spring 36 by suitable clamp plates 38 and bolts 39. The frame rear-end member 37 depends inside of the upstanding intermediate portion of the rear spring 36 and supports the frame from the center portion of the spring for tilting movements of the frame relative to the spring. The tilting movements of the rear end of the frame relative to the rear spring are also limited by U-shaped clevises 35 which surround the spring at locations spaced from the center thereof and are adjustably secured to the frame rear-end member by suitable means, such as bolts 40 insertable through an aperture in each side or leg of the frame member 37 and through one of a series of apertures 41 provided in the corresponding clevises 35.

The connections between the front spring and the frame front-end member and the rear spring and the frame rear-end member are located well above the center of gravity of the frame and the body and other structures supported by the frame, so that in rounding a curve centrifugal force acting at the center of gravity of the frame-and-body assembly will tend to swing the frame outwardly at the bottom to the extent permitted by the clevises 35 on the side of the vehicle at the inner-side of the curve. When these clevises contact the corresponding sides of the front and rear springs a downward force will be imparted to the inner front and rear wheels of the vehicle which force will serve to maintain these inner wheels upon the track or roadway and in firm engagement therewith so that the traction of all four of the vehicle wheels is available at all times, even when the vehicle is rounding a sharp curve at high speed. By maintaining the traction of all four of the vehicle wheels with the track or roadway the centrifugal forces acting on the vehicle and which tend to cause the vehicle to skid or upset, are distributed among the four wheels of the vehicle, rather than being applied to the two wheels at the outside of the curve, as is the case with conventional spring suspensions, thereby greatly delaying and usually entirely preventing a skid or upset of the vehicle.

The front and rear axles of the vehicle are maintained in proper alignment with each other by two pair of radius rods including a front pair of rods 42 and a rear pair 43. All of the rods 42 and 43 may be similar in construction and comprise a pair of parallel, spaced-apart bars 44 which may be provided by bending a straight rod or tube to a hairpin shape so that the bars are connected at one end by the U-bend 45 thus provided. Adjacent their opposite ends the two bars 44 are interconnected by a welded in strut 46. The inner adjacent ends of the two pair of radius rods are connected to the frame intermediate its length by a pair of double-sided brackets 47, the front ends of the front pair of radius rods are connected to the front axle by brackets 48 and the rear ends of the rear pair of radius rods are connected to the rear-axle housing by rear brackets 49.

Each intermediate bracket 47 may conveniently comprise a plate, riveted or otherwise secured to the outer surface of the frame side member 19 near the mid-length position thereof and depending below the frame side member, as is particularly illustrated in Figure 7. Each plate 47 has in the lower portion thereof a pair of tapered holes spaced apart with their centers on a line substantially parallel to the corresponding frame side member 19 which holes receive securing pins of respective ball-and-socket joints 68. Complementary portions of the ball-and-socket joints are secured to the front and rear radius rods 42 and 43, respectively, at the corresponding side of the frame by means of threaded stems which are adjustably threaded into the inner or adjacent ends of the radius rods and are secured in adjusted position therein by lock nuts 69.

Each front bracket 48 comprises three integral apertured lugs, one of which is larger than the other two, and is secured to the front axle 11 preferably by being welded thereto, and the other two of which have tapered apertures receiving the fastening pins of components of ball-and-socket joints 50, the complementary components of which are adjustably secured to the ends of the parallel bars 44 of the corresponding front radius rods 42. The complementary components are adjustably secured to the ends of the radius rod bars by screw-threaded stems threaded into the ends of the bars and secured in adjusted position therein by suitable lock nuts 51.

Each rear bracket 49 also comprises a plate providing three integral apertured lugs, one of which is larger than the others and surrounds the rear axle housing 13 and is welded or otherwise rigidly secured thereto, as particularly illustrated in Figure 6. The other two lugs are provided with tapered apertures which receive tapered securing pins 52 of the inner components of respective ball-and-socket joints 53, the outer components of which are adjustably secured to the rearward ends of the corresponding rear radius rods 43 by means of respective screw-threaded stems 54 threaded into the rearward ends of the radius rod bars and secured in adjusted position therein by respective lock nuts 55.

Each rear bracket 49 is also provided with a rearwardly-extending spring hanger 56 comprising a rearward extension of the bracket plate and a pair of spaced-apart apertured lugs 57 and 58, the aligned apertures of which receive a spring shackle bolt 59 by means of which the rear spring shackles 60 are secured to the rear axle.

With the above-described radius rod construction, with the frame 14 exactly centered relative to the front and rear axles the ball-and-socket joints may be longitudinally adjusted until the axles are brought into a condition of exact parallelism and in which they extend transversely of the frame at right angles thereto. Because of the spring construction in which the attachment points between the frame and the springs are above the combined center of gravity of the frame, body and other devices carried by the frame, upon rounding a curve the frame will swing outwardly toward the wheels at the outside of the curve. The radius rods are disposed at an angle to the frame, the front radius rods diverging forwardly and outwardly and the rear radius rods diverging rearwardly and outwardly. Outward swinging of the frame thus tends to decrease the angularity of the outer front and rear radius rods and increase the angularity of the inner front and rear radius rods which has the effect of increasing the wheel base at the outer side of the vehicle, and decreasing the wheel base at the inner side. The rear axle is thus swung relative to the frame in a direction to carry the rear end of the vehicle outwardly around the curve, and the front axle is simultaneously swung inwardly to carry the front end of the vehicle inwardly of the curve, this change in the relative position of the two axles materially assisting the driver in steering the vehicle around the curve and also counter-balancing a large portion of the centrifugal forces acting on the vehicle when rounding a sharp curve at high speed.

When the front and rear axles of the vehicle are thus inclined relative to each other their extended center-lines will intersect at a point which may be brought as near to the center of curvature of the curved path of the vehicle as desired by proper arrangement of the geometry of the frame, axles, and radius rods.

From the above description it will be apparent that the improved spring-suspension system greatly increases the safety of a vehicle, such as a racing car, when rounding curves at high speed, renders the vehicle much easier to steer around the curves of a track or other race course over which the vehicle is propelled, permits the negotiation of sharp curves at much higher speeds than is possible with conventional spring-suspension systems and materially reduces driver fatigue.

The above-described tilting of the body and frame on a curve keeps the body of the driver substantially in line with the combined effect of gravity and centrifugal force so that the driver is not thrown to the outer side of the seat and thus his control of the car is not endangered. The engine, being also mounted on the frame, is tilted on a curve so that the oil level is maintained substantially normal and the fuel supply is not seriously affected. Most racing cars use V–8 type engines, and with conventional spring suspensions the fuel is thrown outwardly by centrifugal force on a curve, starving the inner bank of cylinders and flooding the outer bank. With the improved spring suspension of the present invention a normal supply of fuel to both banks of cylinders is maintained. This materially improves engine operation on curves and renders it possible to maintain a much higher average speed of the car during a race.

Also, as pointed out above, the centrifugal forces acting on the car in rounding a curve are substantially equally distributed among all four tires. This not only reduces any tendency of the car to skid, but materially reduces tire wear so that very little, if any, racing time is lost at the pit changing tires or making other adjustments.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In an automotive vehicle having a body-supporting frame, a pair of front and a pair of rear road wheels, a front axle carrying said front wheels and a rear axle carrying said rear wheels; a spring-suspension system between said frame and said axles comprising a pair of front brackets secured one to each end portion of the vehicle front axle, a pair of rear brackets secured one to each end portion of the vehicle rear axle, a pair of intermediate brackets secured one to each side of said vehicle frame intermediate the length thereof, a pair of front radius rods each extending from a respective intermediate bracket to the front bracket at the same side of the vehicle frame, a pair of rear radius rods each extending from a respective intermediate bracket to the rear bracket at the same side of the vehicle frame, a ball-and-socket joint between each end of each radius rod and the corresponding bracket, a pair of upstanding, inverted U-shaped cross members disposed one at each end of said frame, a generally U-shaped, transverse front spring having its ends secured to said front axle adjacent the opposite ends thereof and secured at its center to the center of the forward transverse frame member, and a U-shaped rear transverse spring secured at its ends to said rear brackets and at its center to the center of the rear transverse frame member, the connection points between said transverse frame members and said springs being disposed above the center of gravity of the frame-and-body combination of the vehicle, whereby said frame tends to swing outwardly as said vehicle rounds a curve applying a downward force to the inner-end of each spring and shifting said radius rods to move said axles out of their normal position of parallelism with each other to a position in which the inner-ends of said axles are nearer together than the outer ends thereof.

2. A spring-suspension system for a vehicle having a front axle, a pair of front wheels journaled on said front axle, a rear axle, a pair of rear wheels journaled on said rear axle, a frame, a body carried by said frame, steering means carried by said frame and operatively connected to said front wheels, and means driving said rear wheels; said suspension system comprising a pair of front and a pair of rear radius rods, means operatively connecting the adjacent ends of said radius rods to said frame intermediate the length thereof, means operatively connecting the remote ends of said radius rods to said axles adjacent the ends thereof and outwardly of the corresponding connections between the adjacent ends of said radius rods and said frame, a transverse front spring connected at its ends to the end portions of said front axle and having an upstanding, inverted U-shaped intermediate portion, an inverted, U-shaped frame front end member underlying the intermediate portion of said front spring and secured at its center to the center of said spring, a transverse rear spring connected at its ends to said rear axle near the opposite ends thereof and having an upstanding, inverted U-shaped intermediate portion, and an inverted, U-shaped frame rear end member underlying said rear spring and connected at its center to the center of said spring, the connections between said frame and said springs being disposed above the connections between said radius rods and said frame.

3. A spring-suspension system for a vehicle having a front axle, a pair of front wheels journaled on said front axle, a rear axle, a pair of rear wheels journaled on said rear axle, a frame, a body carried by said frame, steering means carried by said frame and operatively connected with said front wheels, and means driving said rear wheels; said spring-suspension system comprising a pair of front and a pair of rear radius rods, means operatively connecting the adjacent ends of said radius rods to said frame intermediate the length thereof, means operatively connecting the remote ends of said radius rods to said axles adjacent the ends thereof and outwardly of the corresponding connections between the adjacent ends of said radius rods and said frame, a transverse front spring connected at its ends to the end portions of said front axle and having an upstanding, inverted U-shaped intermediate portion, an inverted, U-shaped frame front end member underlying the intermediate portion of said front spring and secured at its center to the center of said spring, a transverse rear spring connected at its ends to said rear axle near the opposite ends thereof and having an upstanding, inverted U-shaped intermediate portion, an inverted U-shaped frame rear end member underlying said rear spring and connected at its center to the center of said spring, the connections between said frame and said springs being disposed above the connections between said radius rods and said frame, and lost-motion connectors between said frame end members and said springs spaced from the connections between said frame end members and said springs to limit tilting movement of said frame relative to said axles.

4. A spring-suspension system for a vehicle having a front axle, a pair of front wheels journaled on said front axle, a rear axle, a pair of rear wheels journaled on said rear axle, a frame, a body carried by said frame, steering means carried by said frame and operatively connected to said front wheels, and means driving said rear wheels; said suspension system comprising a pair of front and a pair of rear radius rods, means operatively connecting the adjacent ends of said radius rods to said frame intermediate the length thereof, means operatively connecting the remote ends of said radius rods to said axles adjacent the ends thereof and outwardly of the corresponding connections between the adjacent ends of said radius rods and said frame, a transverse front spring connected at its ends to the end portions of said front axle and having an upstanding, inverted U-shaped intermediate portion, an inverted, U-shaped frame front end member underlying the intermediate portion of said front spring and secured at its center to the center of said spring, a transverse rear spring connected at its ends to said rear axle near the opposite ends thereof and having an upstanding, inverted U-shaped intermediate portion, and an inverted, U-shaped frame rear end member underlying said rear spring and connected at its center to the center of said spring, the connections between said frame and said springs being disposed above the connections between said radius rods and said frame, each of said radius rods comprising a pair of substantially parallel, inter-connected bars, and each radius rod end connection comprising a bracket rigidly secured to the corresponding frame or axle and ball-and-socket joints secured to the corresponding brackets and radius rod ends.

5. A spring-suspension system for a vehicle having a front axle, a pair of front wheels journaled on said front axle, a rear axle, a pair of rear wheels journaled on said rear axle, a frame, a body carried by said frame, steering means carried by said frame and operatively connected to said front wheels, and means driving said rear wheels; said suspension system comprising a pair of front and a pair of rear radius rods, means operatively connecting the adjacent ends of said radius rods to said frame intermediate the length thereof, means operatively connecting the remote ends of said radius rods to said axles adjacent the ends thereof and outwardly of the corresponding connections between the adjacent ends of said radius rods and said frame, a transverse front spring connected at its ends to the end portions of said front axle and having an upstanding, inverted U-shaped intermediate portion, an inverted, U-shaped frame front and member underlying the intermediate portion of said front spring and secured at its center to the center of said spring, a transverse rear spring connected at its ends to said rear axle near the opposite ends thereof and having an upstanding, inverted U-shaped intermediate portion, and an inverted, U-shaped frame rear end member underlying said rear spring and connected at its center to the center of said spring, the connections between said frame and said springs being disposed above the connections between said radius rods and said frame, each of said radius rods comprising a pair of substantially parallel, inter-connected bars, and each radius rod end connection comprising a bracket rigidly secured to the corresponding frame or axle and ball-and-socket joints secured to the corresponding brackets and radius rod ends, the brackets secured to said rear axle having spring hangers thereon for connecting the ends of said rear spring to said rear axle.

6. A spring-suspension system for a vehicle having a pair of axles, a pair of wheels journaled on each axle, and a body-carrying frame; said suspension system comprising a pair of transverse springs operatively disposed one between each axle and the corresponding end of same frame, and two pair of radius rods operatively connected one pair between said front axle and the intermediate portion of said frame and the other pair between said rear axle and the intermediate portion of said frame, said frame being connected to said springs at locations above said frame.

EDWARD H. GILLITZER.

REFERENCES CITED

The following references are of record in the file of this patent:

UNITED STATES PATENTS

| Number | Name | Date |
| --- | --- | --- |
| 943,764 | Boomer | Dec. 21, 1909 |
| 1,012,620 | Ford | Dec. 26, 1911 |
| 1,153,602 | Chapin | Sept. 14, 1915 |
| 1,221,190 | Knudsen | Apr. 3, 1917 |
| 2,234,025 | Dellert | Mar. 4, 1941 |
| 2,417,019 | Sherman | Mar. 4, 1947 |